(12) United States Patent
Webster

(10) Patent No.: US 11,045,041 B2
(45) Date of Patent: Jun. 29, 2021

(54) MULTIPLE COMPARTMENT DECANTER FOR BREWER HAVING A RINSING SYSTEM AND VERSATILE PIVOT

(71) Applicant: Joseph P. Webster, St. Charles, MO (US)

(72) Inventor: Joseph P. Webster, St. Charles, MO (US)

(73) Assignee: Newco Enterprises, Inc., St Charles, MO (US)

(*) Notice: Subject to any disclaimer, the term of this patent is extended or adjusted under 35 U.S.C. 154(b) by 254 days.

(21) Appl. No.: 16/350,536

(22) Filed: Nov. 29, 2018

(65) Prior Publication Data

US 2019/0110636 A1    Apr. 18, 2019

Related U.S. Application Data

(63) Continuation of application No. 14/756,042, filed on Jul. 24, 2015, now abandoned, which is a continuation-in-part of application No. 12/927,014, filed on Nov. 4, 2010, now abandoned.

(60) Provisional application No. 62/123,226, filed on Nov. 10, 2014, provisional application No. 61/280,658, filed on Nov. 7, 2009.

(51) Int. Cl.
| | |
|---|---|
| *A47J 31/44* | (2006.01) |
| *A47J 31/00* | (2006.01) |
| *A47J 31/60* | (2006.01) |
| *A47J 31/50* | (2006.01) |
| *A47J 31/46* | (2006.01) |

(52) U.S. Cl.
CPC .............. *A47J 31/60* (2013.01); *A47J 31/467* (2013.01); *A47J 31/50* (2013.01)

(58) Field of Classification Search
CPC .............................. A47J 31/007; A47J 31/50
USPC ........................................................... 219/316
See application file for complete search history.

(56) References Cited

U.S. PATENT DOCUMENTS

| | | | | |
|---|---|---|---|---|
| 763,401 | A * | 6/1904 | Januliewicz | .......... A47J 31/007 99/291 |
| 3,608,471 | A * | 9/1971 | Martin | .................... A47J 31/56 99/283 |
| 3,971,304 | A * | 7/1976 | Cvitkovich | ............. A47J 31/50 99/291 |

(Continued)

*Primary Examiner* — Robert J Utama
*Assistant Examiner* — Lawrence H Samuels
(74) *Attorney, Agent, or Firm* — Paul M. Denk

(57) ABSTRACT

A multiple tank brewer having a rinsing system is disclosed which comprises a container having a first top and a first tank for receiving a first brewed beverage through the first top, the first tank having a first bottom outlet, and a second top and a second tank for receiving a second brewed beverage through the second top, the second tank having a second bottom outlet, a first tube connected between the first bottom outlet, a first pinch valve, and a first dispenser nozzle, a first drain tube connected between the first pinch valve and a drain line, a second tube connected between the second bottom outlet, a second pinch valve, and a second dispenser nozzle, a second drain tube connected between the second pinch valve and the drain line, a rinse tube, and a rinse spray head for delivering rinse water into the first tank through the first top, out through the first bottom outlet, through the first tube, the first pinch valve, the first drain tube, and the drain line. A base for the container provides for pivoting of the container.

5 Claims, 9 Drawing Sheets

(56) References Cited

U.S. PATENT DOCUMENTS

| | | | | |
|---|---|---|---|---|
| 6,155,158 | A * | 12/2000 | Anson | A47J 31/007 99/280 |
| 6,401,729 | B1 * | 6/2002 | Ford | A47J 31/007 134/22.1 |
| 6,439,105 | B1 * | 8/2002 | Ford | A47J 31/057 99/280 |
| 7,234,389 | B1 * | 6/2007 | Lassota | A47J 31/002 99/280 |
| D655,124 | S * | 3/2012 | Schenk | D7/307 |
| D863,856 | S * | 10/2019 | Webster | D7/307 |
| 2004/0183693 | A1 * | 9/2004 | Hart | G07F 5/18 340/870.11 |
| 2006/0137533 | A1 * | 6/2006 | Wise | A47J 31/4478 99/279 |
| 2011/0107919 | A1 * | 5/2011 | Webster | A47J 31/50 99/288 |
| 2016/0213194 | A1 * | 7/2016 | Webster | A47J 31/467 |

* cited by examiner

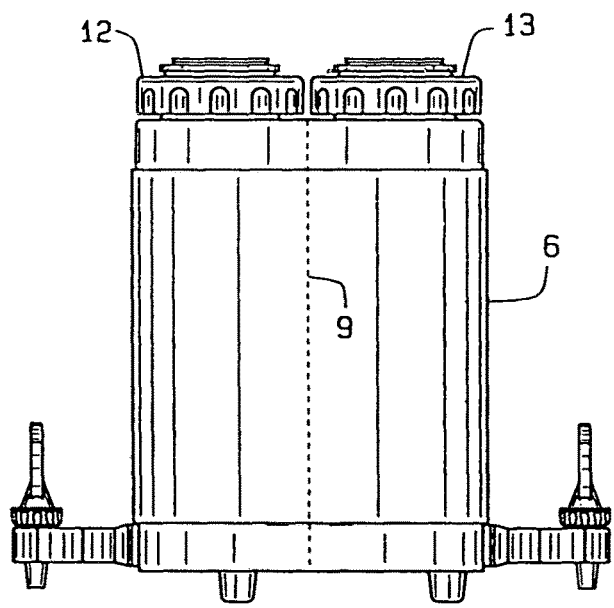
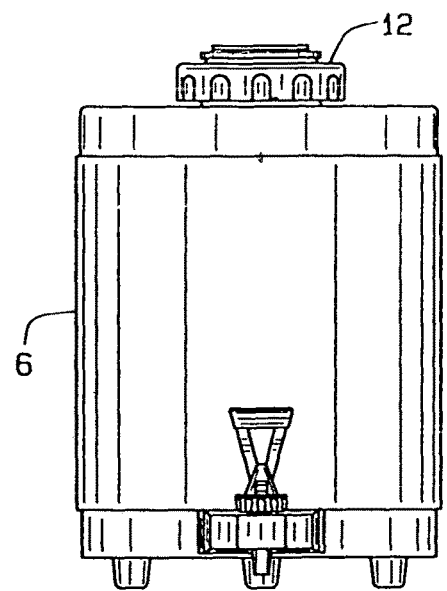
FIG.3A
FIG.3B
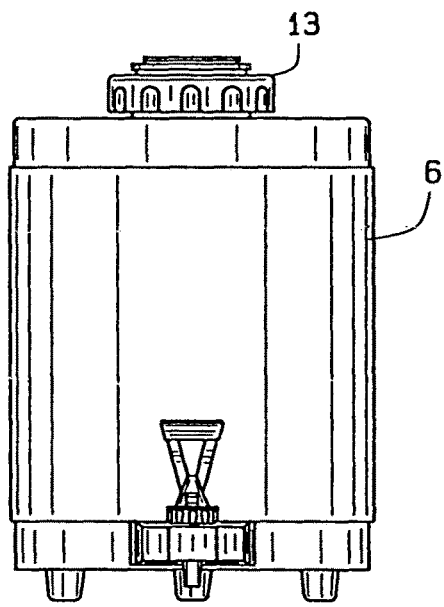
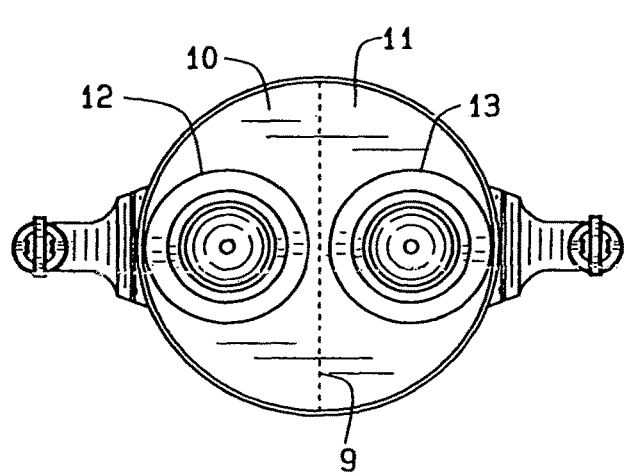
FIG.3C
FIG.3D

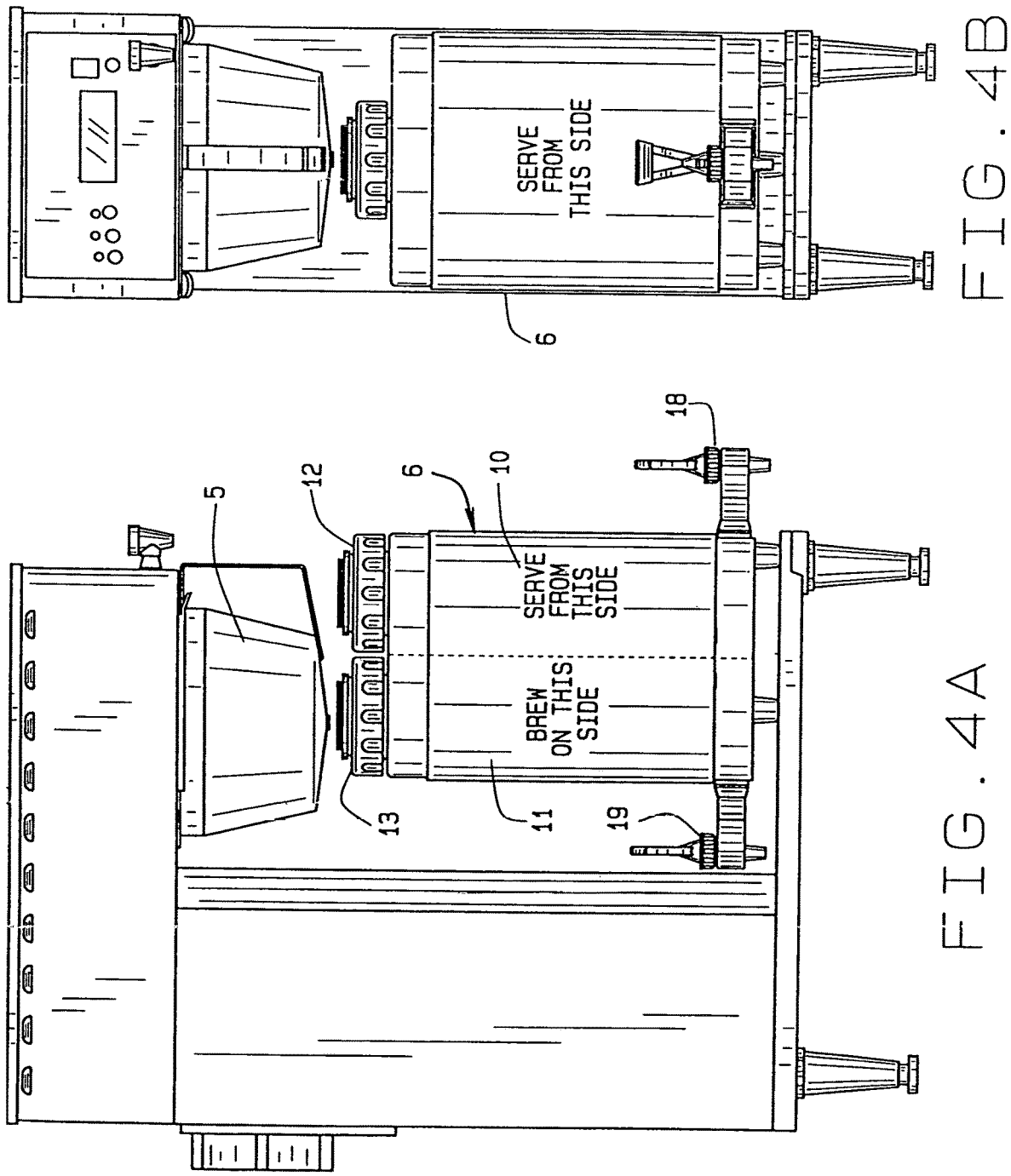

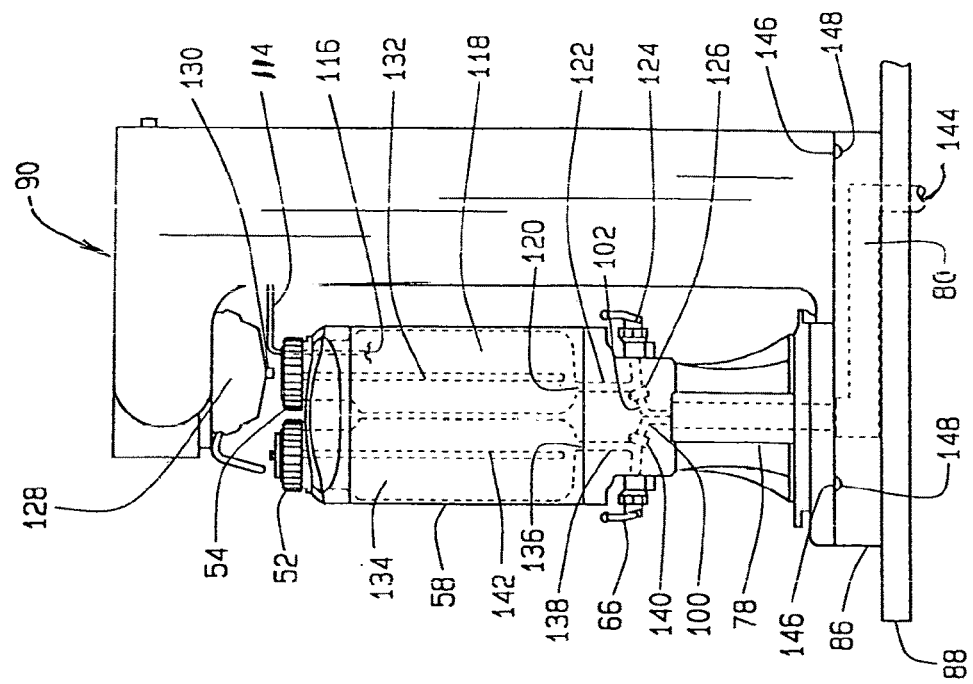
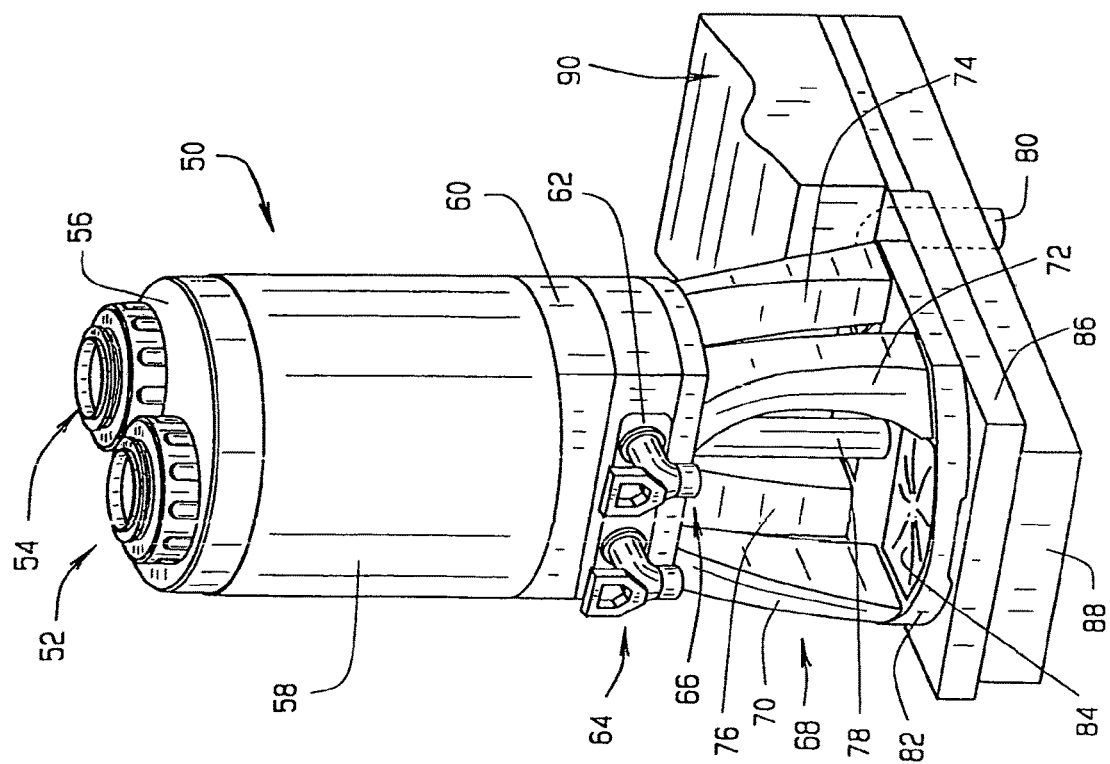

MULTIPLE COMPARTMENT DECANTER FOR BREWER HAVING A RINSING SYSTEM AND VERSATILE PIVOT

CROSS REFERENCE TO RELATED APPLICATION

This is a continuation application to the application having Ser. No. 14/756,042, filed on Jul. 24, 2015, which application is the non-provisional patent application that claims priority to the provisional patent application having Ser. No. 62/123,226, filed on Nov. 10, 2014, which claims priority to the continuation-in-part patent application having Ser. No. 12/927,014, filed on Nov. 4, 2010, which claims priority to the provisional patent application having Ser. No. 61/280,658, filed on Nov. 7, 2009.

FIELD OF THE DISCLOSURE

This disclosure relates to brewing of a beverage, and more specifically relates to a multiple compartment container for a brewer for allowing for simultaneous brewing and dispensing of a brewed beverage and rinsing of the multiple compartments in which the beverage is brewed.

BACKGROUND

Various styles of decanters have long been available in the art. Obviously, in the early days, coffee was brewed into a glass coffee pot, and was kept warm by the warmer internal to the brewer base or top cover until it was consumed. The problem with that is that while the coffee was maintained in warmed state, until it was fully consumed, another pot of fresh coffee could not be brewed until the first coffee pot was fully removed. Thus, there is always a gap in the availability of freshly brewed coffee because of this arrangement.

In addition, of recent origin, are the larger decanters that can fit within an oversized brewer, and allow for the brewing of a larger quantity of coffee or tea, and have it readily available for dispensing, through usage of the container apparatus. But, once again, while the decanter was maintained in a warmed state, upon the brewer, or if it should be removed, under the later circumstance, the brewed beverage would not remain in a warm state because of the removal of the decanter from the heating pad of the brewer. Thus, there is always the predicament that either all of the coffee or tea had to be dispensed, or it had to be removed from the brewer, to brew a fresh pot of beverage, but under those circumstances, maintaining its warmth was nonexistent. Thermos style decanters and dispensers have replaced glass decanters because they do not need an external heat source to maintain beverage temperature.

The decanters or containers in which beverages, such as coffee or tea, are brewed require regular cleaning to maintain beverage freshness. Even though the heat is removed from the decanter after use, coffee oils and tea residue will stay in contact with the side wall of the decanter or container unless the side wall is rinsed. During times of high usage, it may not be possible or practical to clean each decanter after use. If the tanks or containers that contain brewed beverages are not cleaned on a regular basis, then the subsequently brewed beverage may suffer in taste quality. In some establishments it is important to have a consistently tasting brewed beverage to keep repeat customers. Without being able to clean or sanitize the container in which beverages are brewed on a consistent basis, a quality brewed beverage may not be obtained.

The present disclosure is designed to obviate and overcome many of the disadvantages and shortcomings experienced with prior decanters. The present disclosure is related to a multiple tank container for a brewer having a rinsing system to rinse away any oils or residue left after dispensing the brewed beverage to maintain the taste quality of the beverage brewed within the multiple tanks.

SUMMARY OF THE DISCLOSURE

This disclosure contemplates the use of a multiple tank container for a brewer having a rinsing system for cleaning an interior of each brewing tank.

The device of the present disclosure is used to provide a rinsing spray to an interior of a tank that stores a brewed beverage. The rinsing spray is used to clean and sanitize the interior of the tank to maintain the freshness of the brewed beverage stored therein. In the case of a thermal vessel, the rinsing spray may be used to preheat the container.

In one form of the present disclosure, a multiple tank brewer having a rinsing system is disclosed in which the multiple tank brewer having a rinsing system comprises a container having a first top and a first tank for receiving a first brewed beverage through the first top, the first tank having a first bottom outlet, and a second top and a second tank for receiving a second brewed beverage through the second top, the second tank having a second bottom outlet, a first tube connected between the first bottom outlet, a first pinch valve, and a first dispenser nozzle, a first drain tube connected between the first pinch valve and a drain line, a second tube connected between the second bottom outlet, a second pinch valve, and a second dispenser nozzle, a second drain tube connected between the second pinch valve and the drain line, a rinse tube, and a rinse spray head for delivering rinse water into the first tank through the first top, out through the first bottom outlet, through the first tube, the first pinch valve, the first drain tube, and the drain line.

In light of the foregoing comments, it will be recognized that the present disclosure provides a multiple tank brewer having a rinsing system that can clean and sanitize each tank to maintain beverage freshness.

The present disclosure provides a multiple tank brewer having a rinsing system in which the amount of water is controllable.

The present disclosure provides a multiple tank brewer having a rinsing system in which the rinsing system has operable drain valves to drain away rinsing water from each tank after a rinsing operation.

The present disclosure provides a multiple tank brewer having a rinsing system that indicates when a rinsing operation has been completed and the tanks are ready for another brewing operation or cycle.

The present disclosure provides a multiple tank brewer having a rinsing system with the multiple tank brewer having a multi-compartmentalized decanter each of which may accept and hold a plurality of brewed beverages, awaiting its dispensing to a consumer.

The present disclosure is also directed to a multiple tank brewer having a rinsing system having a pair or more of separate compartments that may accept a freshly brewed beverage, for subsequent dispensing, simply through an orientation of the decanter in its placement upon the brewer.

The present disclosure provides a multiple tank brewer having a rinsing system that provides a continuous supply of freshly brewed beverage, whether it be tea or coffee, or other liquid, all of which may be contained within separate integrated compartments embodied within a singular decanter.

The present disclosure provides for a multiple tank brewer having a rinsing system that has an access opening in the top of a decanter having discrete integral compartment therein, and with each compartment having its own rinse cap and a spigot, proximate at the bottom, for dispensing of any brewed beverage contained therein.

These and other advantages of the present disclosure will become apparent to those skilled in the art after considering the following detailed specification in conjunction with the accompanying drawings.

BRIEF DESCRIPTION OF THE DRAWINGS

In referring to the drawings:

FIG. 3a is a side view of the decanter shown in FIG. 2;

FIG. 3b is a front view of the decanter shown in FIG. 2;

FIG. 3c is a back view of the decanter shown in FIG. 2;

FIG. 3d is a top plan view of the decanter shown in FIG. 2;

FIG. 4a provides a side view of the decanter shown in FIG. 2 resting upon the brewer as disclosed in FIG. 1;

FIG. 4b is a front view of the decanter upon its brewer as disclosed in FIG. 1;

FIG. 7 is a perspective view of a multiple tank brewer having a rinsing system constructed according to the present disclosure with a drain line shown in phantom;

FIG. 9 is a side view of the multiple tank brewers having a rinsing system with the rinsing system shown in phantom.

DETAILED DESCRIPTION OF PREFERRED EMBODIMENT

Figure 1:
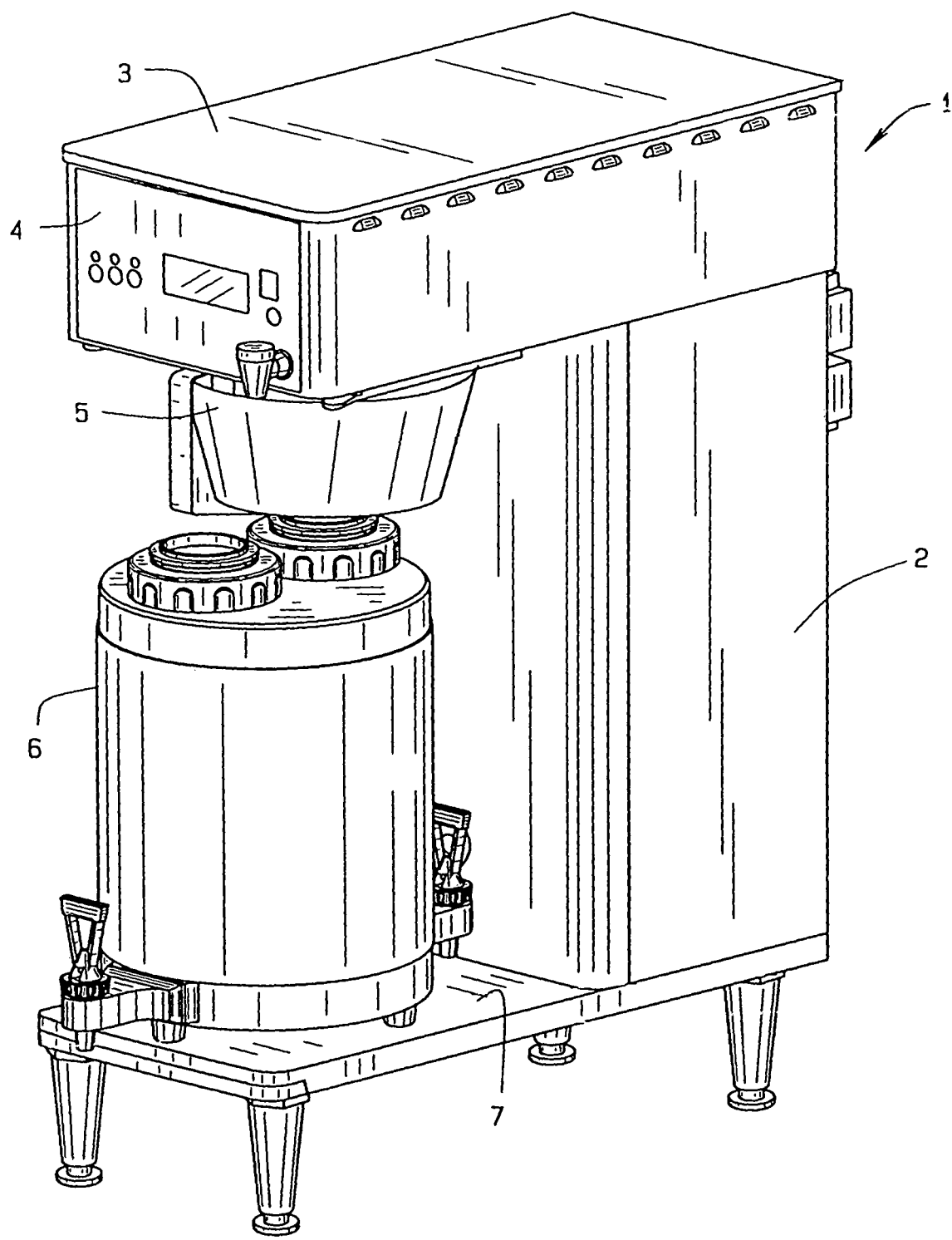
FIG. 1 is an isometric view of a multiple brewing and dispensing decanter shown seating under the brew basket of the disclosed brewing apparatus.

In referring to the drawings, and in particular FIG. 1, a standard brewer 1 is readily disclosed, incorporating its housing 2 and an upper compartment 3 having its control panel 4 and supporting a brew basket 5 applied, containing a supply of grounds for brewing through the application of hot water of a fresh beverage into a decanter 6 of the present disclosure. The decanter 6 rest upon the elevated base 7 of the brewer 1, as can be noted.

Figure 2:
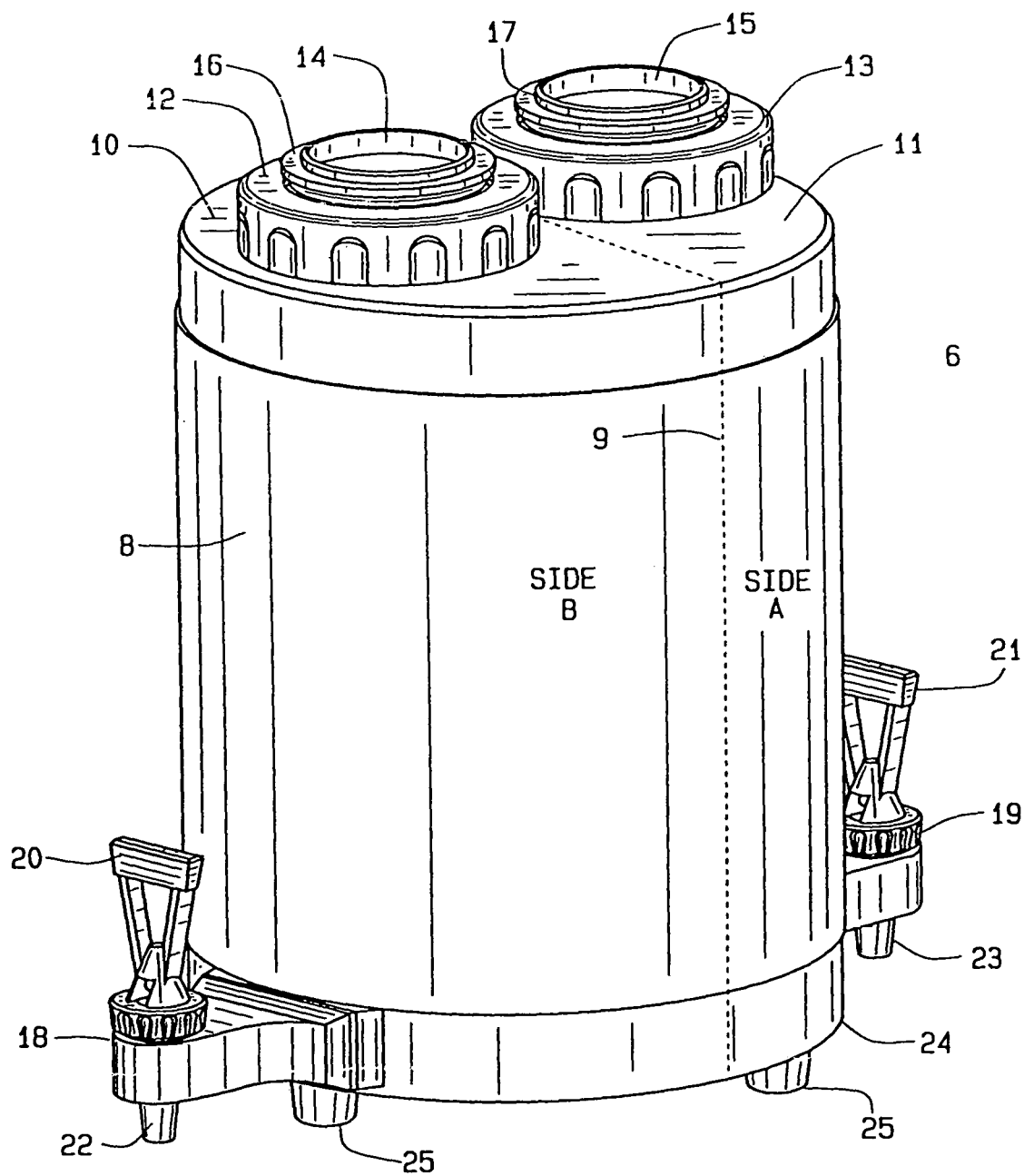
FIG. 2 provides an isometric view of a double compartmentalized decanter of the present disclosure, wherein an integrated divider is provided internally of the decanter to separate it into two separate and isolated compartments, each having its own entrance opening, and associated spigot.

The multiple brewing and dispensing decanter 6 of the present disclosure is readily disclosed in FIG. 2, as can be noted, and it contains an outer wall 8 with an integral divider 9 provided internally within the decanter 6, so as to separate it into tow discrete compartments 10 and 11, as can be noted. Operatively associated with each compartment 10 and 11 is an inlet 12 and 13, respectively, and each inlet 12 and 13 provide for deposit within its respective compartment 10 and 11 of the freshly brewed beverage through various openings 14 and 15 located through the upper portions of each of the said inlets 12 and 13. Each inlet 12 and 13 is capable of otherwise engaging, or is integrally formed therewith, or can be threadably engaged onto the top of their respected decanter openings (not shown) provided through the upper surface of the compartments 10 and 11, and can be secured into position by known methods. In addition, it can be seen that there may be threads or connecting means 16 and 17 provided with their access openings, so that other closure means may be applied there on, to seal off their heated contents, in the event that the decanter or carafe is moved to a different location. There may be a handle (not shown) operatively associated with the top of the decanter 6, to facilitate its conveyance.

In addition, although it is not shown, it is possible that the sidewalls of the decanter 6, within its housing 8, may be insulated, probably through a double walled structural configuration, in order to sustain the warmth of the various brewed beverages contained within their respective compartments 10 and 11. Furthermore, the decanter may have its own electric element provided therein, within its sidewalls, and which may be electrically charged or battery operated to furnish heat to maintain the warmth of the brewed beverage separately contained therein, during its usage and consumption.

As can be noted proximate the base of the decanter 6 is a spigot for each compartment, with a spigot 18 being operatively associated with the compartment 10, and a spigot 19 being operatively associated with the compartment 11, so that when their operating handles 20 and 21 are manipulated, the separate beverages may be dispensed from their spouts 22 and 23, as can be noted. In addition, the base 24 of the decanter 6 may rest upon legs, as at 25, so as to provide some elevation. Or, it may be that the decanter 6 can be formed without legs, and can rest directly upon the heat pad provided normally within the usually formed brewer 1, in order to help maintain the warmth of any beverages that have been discharged into its separate compartments of the vessel, during brewing.

FIG. 3a shows a side view of the decanter 6, showing how the brew inlets 12 and 13 are provided at the front and back of the formed decanter 6, and their respective compartments being separated by the integral partition or divider 9, as can be noted. FIG. 3b shows a front view of the decanter 6, which FIG. 3c provides a back view of the decanter 6.

FIG. 3d provides a top view, and it can be readily seen how the access openings or inlets 12 and 13 are arranged to bifurcate the decanter 6 into the two separate compartments 10 and 11 through their internal divider wall 9 as noted.

As can be noted in FIG. 4a, the operational usefulness of the structured decanter 6 of the present disclosure can be noted. While the front side compartment 10 is provided for serving its contained beverage, that will already have been previously brewed and deposited from the brew basket 5 through its access opening 12 therein, simultaneously, the brew basket 5 will have been recharged with fresh beverage grounds, and is capable of simultaneous brewing into its separate compartment 11 a fresh batch of hot beverage, the brew basket 5 depositing the brewing beverage through the access opening 13, as can be understood. The spigot 18 can be manipulated for dispensing of the previously brewed beverage from the compartment 10 of the decanter 6, while the spigot 19 remains closed. A front view of the assembly is also readily disclosed in FIG. 4b.

Figure 5:
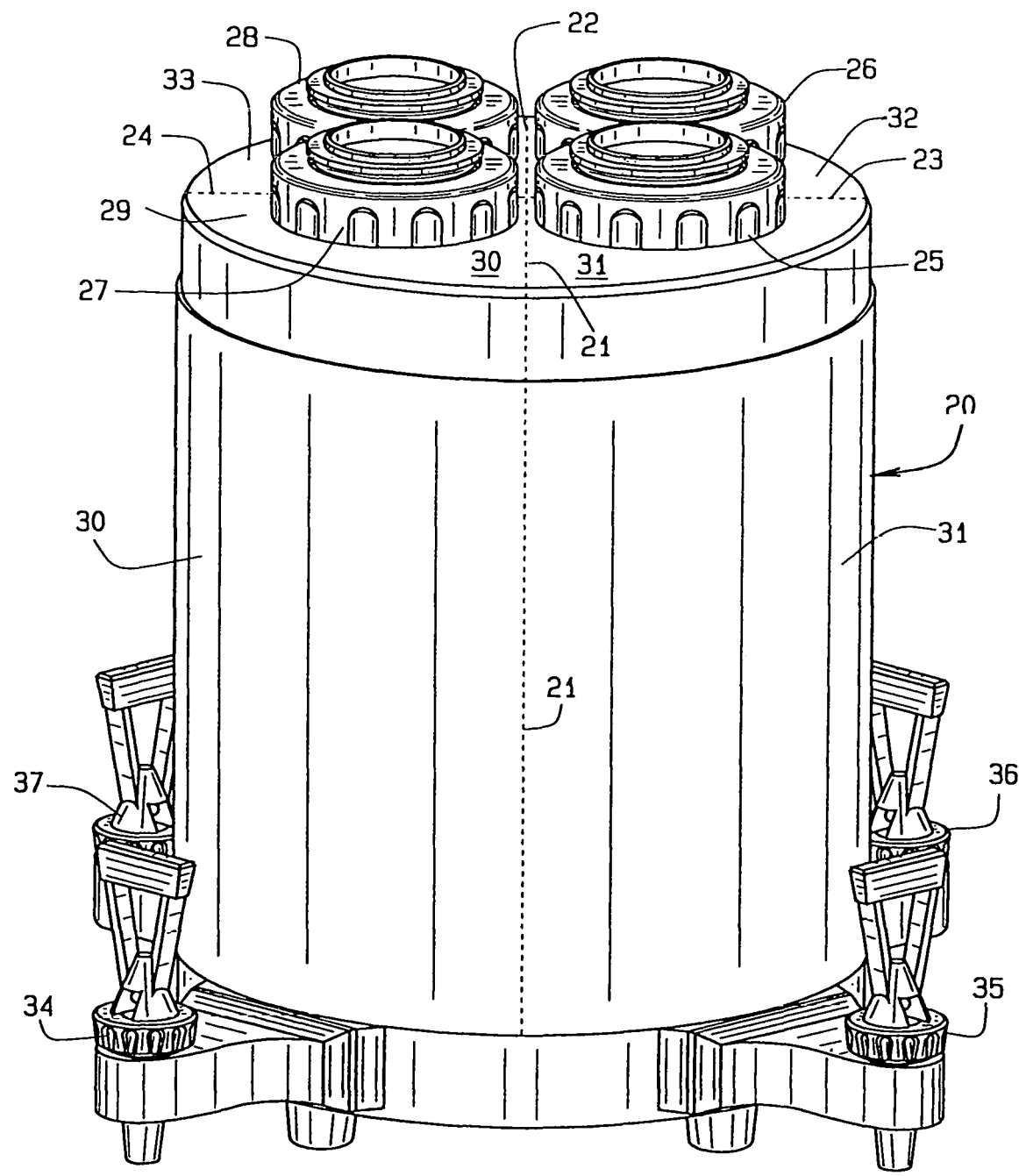
FIG. 5 provides an isometric view of a multi-compartmentalized, or four compartment decanter capable of accepting brewed beverage through any one of its access openings at the top, with each compartment capable of dispensing its contained beverage through manipulation of its associated spigot, arranged at the bottom of the shown decanter.

A variation upon the concept of the present disclosure, in providing a multiple brewing and dispensing decanter, can be seen in FIG. 5. A decanter 20 as shown herein is structured in applying the same principle of the segregated decanter 6, but in this instance, the decanter 20 contains integrally internally four discrete compartments. These compartments are separated by the fluid type dividers 21 through 24, and each compartment has its own access inlet 25 through 28, as can be readily seen. Each of these access inlets 25, 26, 27, and 28 are constructed similarly to the inlets 12 and 13 as previously analyzed, and their interconnection with a top wall 29 of the decanter 20 is similar to the structural relationship as previously reviewed. In addition, each of the compartments, as can be seen at 30 through 33 has its own separate spigot 34 through 27 operatively associated therewith, in order to allow for the discrete dispensing of any brewed beverage from the individual compartments through their respective spigot when a consumer wishes to pour a cup of coffee, tea, hot chocolate, or the like, from the various compartments of the shown decanter 20.

Figure 6A:
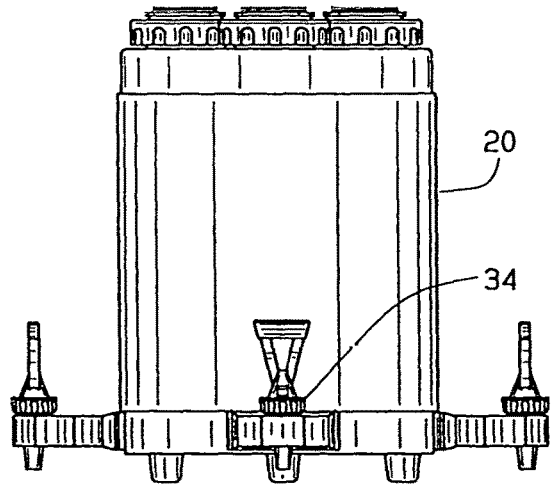
FIG. 6a is a front view of the decanter shown in FIG. 5.
Figure 6B:
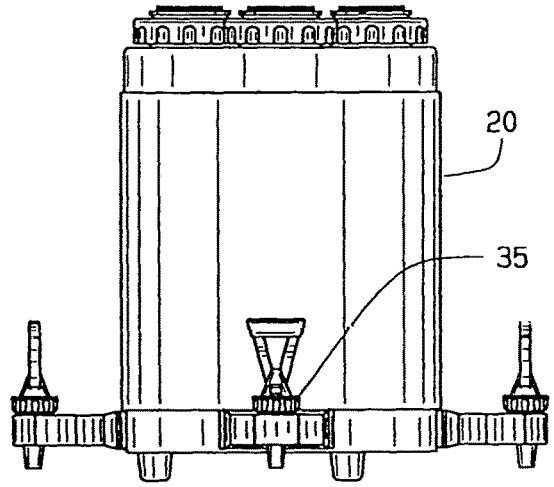
FIG. 6b is a right side view of the decanter shown in FIG. 5.
Figure 6C:
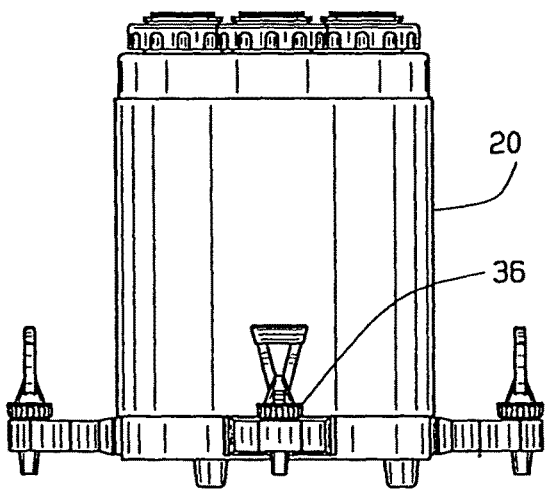
FIG. 6c is a left side view of the decanter shown in FIG. 5.
Figure 6D:
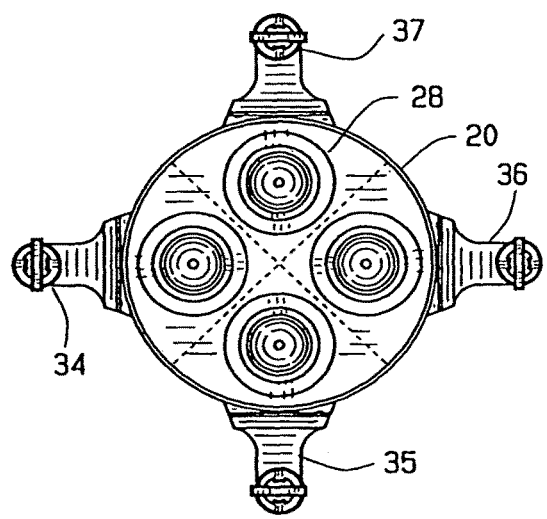
FIG. 6d is a top plan view of the decanter shown in FIG. 5.

FIG. 6a provides a front view of the decanter 20 showing the relationship of the various spigots mounted at quarter segments of the compartmentalized dispenser, while FIG. 6b provides a right side view, and FIG. 6c provides a left side view of the decanter 20. Thus, FIG. 6d provides the top view of the structured decanter 20, and indicates how, in this instance, freshly brewed beverage may be dispensed from the spigot 35, while simultaneous a freshly brewed beverage exiting the brew basket 5 may be deposited within the access opening 28, to fill up that compartment of the decanter 20 with a freshly brewed beverage. Hence, the concept of attaining simultaneously the dispensing of the beverage, while brewing a fresh beverage, can be readily determined from reviewing these drawings.

Referring now to FIG. 7, a multiple tank brewer having a rinsing system 50 are shown. The multiple tank brewers having a rinsing system 50 has a first cap/gauge and clean rinse assembly 52 and a second cap/gauge and clean rinse assembly 54 positioned within a server top 56. The server top 56 is mounted to an outside server wrapper or container 58. The outsider server wrapper 58 is positioned on a base server mounting 60 that has a dispenser nozzle assembly 62 having a first dispense nozzle or spigot 64 and a second dispense nozzle or spigot 66 extending out from the dispenser nozzle assembly 62. A base 68 having four legs 70, 72, 74, and 76 supports the outside server wrapper 58 and the dispenser nozzle assembly 62. A drain tube 78 extends downwardly from the dispenser nozzle assembly 62 and is connected to a drain line 80, which is shown in phantom, to drain rinse liquid and residue from the system 50, as will be explained. A server base 82 has a grate or cup platform 84 upon which may be placed a cup for receiving a beverage from the nozzles 64 and 66. The base 82 is placed upon a riser 86 which is located on a counter top 88. The riser 86 may be used to house the drain tube 78 and the drain line 80 out of sight of customers. Only a portion of a water dispenser assembly 90 of the rinsing system 50 is shown in this particular view.

Figure 8:
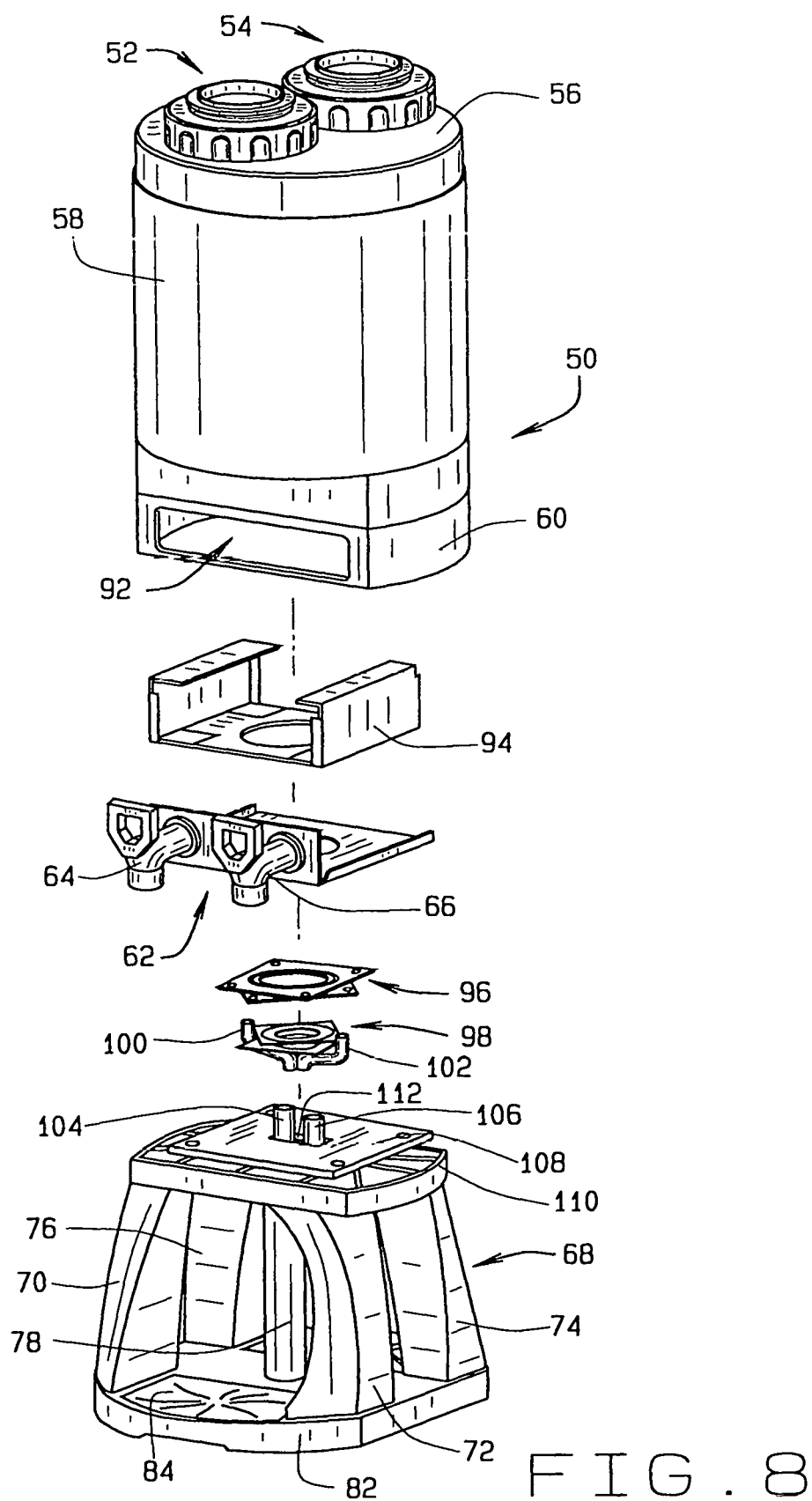
FIG. 8 is an exploded view of the multiple tank brewer having a rinsing system constructed according to the present disclosure.

FIG. 8 illustrates an exploded view of the multiple tank brewers having a rinsing system 50. The multiple tank brewers having a rinsing system 50 is depicted having the first cap/gauge and clean rinse assembly 52 and the second cap/gauge and clean rinse assembly 54 positioned within the server top 56. The server top 56 is mounted to the container 58. The container 58 is positioned on the base server mounting 60 that has an opening 92 that is adapted to receive the dispenser nozzle assembly 62 having the first dispense nozzle 64 and the second dispense nozzle 66. A lower base support 94 is used to accept the dispenser nozzle assembly 62 when the assembly 62 is inserted in the opening 92. A swivel assembly 96 is connected to the dispenser nozzle assembly 62 which provides for the rotation of the container 58, the base server mounting 60, and the nozzles 64 and 66 relative to the base 68. A drain tube and pinch valve assembly 98 is positioned below the swivel assembly 96. The assembly 98 comprises a first drain tube 100 and a second drain tube 102. The first drain tube 100 is connected to a first auxiliary drain tube 104 that is in the drain tube 78. The second drain tube 102 is connected to a second auxiliary drain tube 106 that is fitted in the drain tube 78. A bottom support plate 108 is mounted to an interior top 110 of the base 68. The plate 108 has a center opening 112 through which the auxiliary drain tubes 104 and 106 extend. The base 68 has the four legs 70, 72, 74, and 76, the server base 82, and the grate 84.

With particular reference now to FIG. 9, the multiple tank brewer having a rinsing system 50 is shown in more detail. The water dispenser assembly 90 has a rinse tube 114. A rinse spray head assembly 116 is incorporated into the second cap/gauge and clean rinse assembly 54 into a first interior tank or container 118 that is used to store a brewed beverage. Although not shown in this particular view, the second cap/gauge and clean rinse assembly 54 has an annular opening that the rinse tube 114 is positioned over to inject a stream of rinse water. The water dispenser assembly 90 may be connected to a water supply (not shown) and may include a heating element (also not shown) for providing heated rinse water to the rinse tube 114 and the rinse spray head assembly 116. The first container 118 has a bottom outlet 120 that allows any liquid within the container 118 to flow out of through a tube 122 to either a dispenser nozzle 124 or to a pinch valve 126. The pinch valve 126 is connected to the second drain tube 102. The pinch valve 126 may be electrically or mechanically operative.

In operation, the rinse tube 114 is positioned over the second cap/gauge and clean rinse assembly 54 and rinse water flows from the rinse tube 114 into the rinse spray head assembly 116 into the first container 118 to provide rinse water, such as hot water, into the first container 118. The construction of the rinse spray head assembly 116 is such that the rinse water is sprayed against interior sides of the first container 118. After a rinsing operation or cycle has been completed by the rinse spray head assembly 116 delivering rinse water, the pinch valve 126 is operated to allow any rinse water to flow from the container 118, through the bottom outlet 120, into the pinch valve 126, and through the second drain tube 102 to the drain line 80. In this manner, any residue or brewed beverage left in the container 118 is rinsed out to both sanitize the container 118 and maintain a fresh environmental in the container 118 for brewing another beverage.

The system 50 also has a brew basket 128 within which may be placed a filter and coffee or another beverage to be brewed. Hot water is provided by the water dispenser assembly 90 to flow through the brew basket 128 out an outlet 130 into the second cap/gauge and clean rinse assembly 54 into the first container 118 through a fill tube 132. After a brewing operation is complete, the brewed beverage will be contained within the first container 118. The container 58 is rotated to present the dispenser nozzle 124 over the grate 84. A cup (not shown) may be placed on the grate 84 and the nozzle 124 operated to dispense the brewed beverage stored within the first container 118.

The multiple tank brewer having a rinsing system 50 also has a second interior tank or container 134 in which a second brewed beverage may be stored. The second brewed beverage may be the same or different from the brewed beverage stored in the first container 118. The first cap/gauge and clean rinse assembly 52 is used to cover the second container 134. The second container 134 also has a bottom outlet 136 that allows any liquid within the container 134 to flow out of through a tube 138 to either the dispenser nozzle 66 or to a pinch valve 140. The pinch valve 140 is connected to the first drain tube 100. The pinch valve 140 may be electrically or mechanically operative. The second container 134 also has a fill tube 142. Although not shown in this view, the first cap/gauge and clean rinse assembly 52 also has a rinse spray head assembly incorporated therein. The second interior tank 134 may also be rinsed out by use of the rinse tube 114.

As can be appreciated, the container 58 may be rotated to place the second container 134 in position for a rinse operation and then a brewing operation. The rinse tube 114 and the rinse spray head 116 may be inserted through the first cap/gauge and clean rinse assembly 52 into the second container 134 to provide rinse water into the second container 134 to rinse out any liquid or residue therein. After a rinsing operation has been completed, the pinch valve 140 is opened to allow any rinse water to flow from the second container 134, through the bottom outlet 136, into the pinch valve 140, and through the first drain tube 100 to the drain line 80. After the rinse water has been emptied from the second container 134, the pinch valve 140 is closed and a brewing operation may begin. It is also possible that the system 50 may be fitted with an audible or visual indicator to indicate when a rinsing operation has been completed. Once the rinsing operation is complete, the system 50 may automatically begin a brewing operation.

The drain tube 78 houses the first drain tube 100 and the second drain tube 102 which each funnels into the drain line 80. The drain line 80 is housed within the riser 86 and exits through an opening 144 formed in the counter top 88. The system 50 also has feet 146 that are adapted to fit into indentations 148 formed in the riser 84 to correctly position and locate the system 50 on the riser 84.

By positioning the first assembly 52 and the second assembly 54 at basically a 12 and 6 o'clock orientation, the system 50 is capable of dispensing a brewed beverage from the first tank 118 through the dispenser nozzle 124 while at the same time undergoing a rinsing operation and a brewing operation in the second tank 134. This design allows for time efficiencies of brewing and dispensing as well as eliminating the possibility of prematurely dispensing from one of the containers 118 or 134 or brewing and mixing old and new beverages. The containers 118 and 134 may be sized to each hold 1.5 gallons of a brewed beverage. By placing the assemblies 52 and 54 at the 12 and 6 o'clock positions, the system 50 has independent fill and dispense locations to enhance the operation of the system 50. Rotating the container 58 allows the assemblies 52 and 54 to be positioned to allow either dispensing of a brewed beverage or a rinsing operation followed by a brewing operation.

Figure 10:
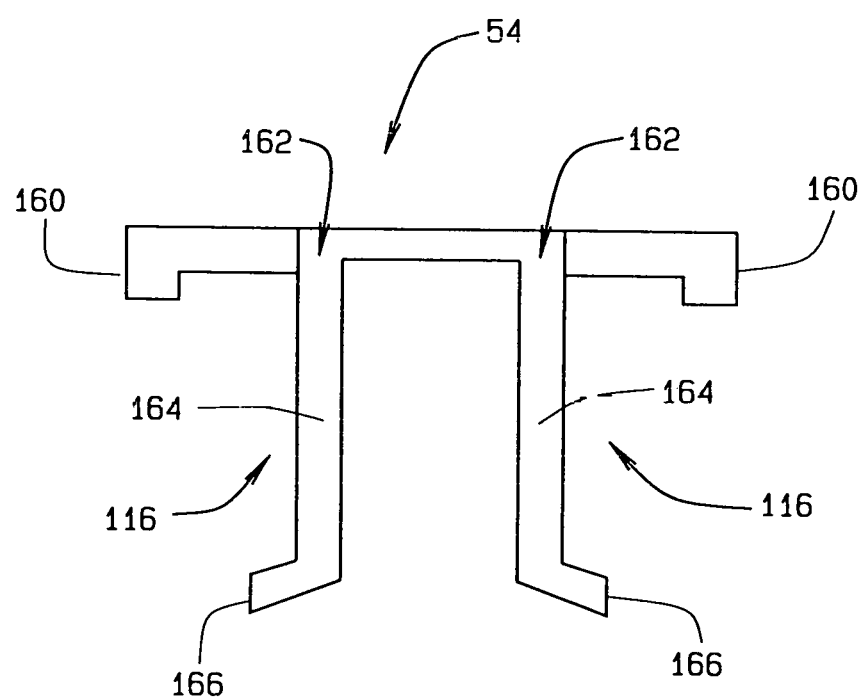
FIG. 10 is a cross-sectional view of a rinse spray head with the cap assembly incorporated into a cap/gauge and clean rinse assembly.

FIG. 10 shows a cross-sectional view of the rinse spray head assembly 116 incorporated into the second cap/gauge and clean rinse assembly 54. The second cap/gauge and clean rinse assembly 54 has a cap 160 that is adapted to being screwed or pressed onto the top of the first container 118. An annular opening 162 is formed in the cap 160. Extending downwardly from the cap 160 is an annular member 164 having an annular outlet 166. Any rinse water that is provided from the rinse tube 114 flows into the annular opening 162 down through the annular member 164 and out through the annular outlet 166. In this manner, a spray rinse is introduced into the first container 118 to rinse the interior of the first container 118. Further, the outlet 166 may have apertures formed therein to provide a stronger spray or spray pattern.

From all that has been said, it will be clear that there has thus been shown and described herein a multiple tank brewer having a rinsing system. It will become apparent to those skilled in the art, however, that many changes, modifications, variations, and other uses and applications of the subject multiple tank brewer having a rinsing system are possible and contemplated. All changes, modifications, variations, and other uses and applications which do not depart from the spirit and scope of the disclosure are deemed to be covered by the disclosure, which is limited only by the claims which follow.

What is claimed is:

1. A multiple compartment decanter for tank brewer having a rinsing system and pivotal movements comprising:
    a decanter incorporating a container having a first top and a first tank for receiving a first brewed beverage through the first top, the first tank having a first bottom outlet, and a second top and a second tank for receiving a second brewed beverage through the second top, the second tank having a second bottom outlet;
    said decanter being a singular decanter integrally incorporating a divider to form within said decanter said first tank and said second tank;
    a base having a drain tube;
    a dispenser nozzle assembly including a first dispenser nozzle and a second dispenser nozzle;
    a first tube connected between the first bottom outlet, a first pinch valve, and a said first dispenser nozzle;
    a first auxiliary drain tube connected to the first pinch valve with the first auxiliary drain tube inserted into the drain tube;
    a second tube connected between the second bottom outlet, a second pinch valve, and a said second dispenser nozzle;
    a second auxiliary drain tube connected to the second pinch valve with the second auxiliary drain tube inserted into the drain tube;
    a rinse tube; and
    a rinse spray head for delivering rinse water into the first tank through the first top, out through the first bottom outlet, through the first tube, the first pinch valve, the first drain tube, and the drain line;
    wherein said rinse tube is adapted for delivering rinse water into the second tank through the second top through a second spray head, out through the second bottom outlet, through the second tube, the second pinch valve, the said auxiliary drain tube, and the drain tube;

said decanter further comprising a swivel assembly between the container and the base for rotating the container relative to the base;

wherein said first pinch valve is opened after the rinse spray head has delivered rinse water, and said first pinch valve is closed after the rinse water has been emptied from the first tank of the container, the second pinch valve is opened after the rinse spray head has delivered rinse water, and wherein said second pinch valve is closed after the rinse water has been emptied from the second tank of the container;

said decanter including said base mounting a lower base support, the dispenser nozzle assembly provided in conjunction with the lower base support, said swivel assembly mounting said lower base support for pivotal movement, relative to said base, thereby allowing said decanter to pivot upon its base when disposing its various compartments for acceptance of a brewed beverage during a brewing cycle.

2. The multiple compartment decanter for brewer having a rinsing system and pivotal movements of claim 1 further comprising an audible indicator for indicating when a rinsing operation has been completed.

3. The multiple compartment decanter for brewer having a rinsing system and pivotal movements of claim 1 further comprising a visual indicator for indicating when a rinsing operation has been completed.

4. The multiple compartment decanter for brewer having a rinsing system and pivotal movements of claim 1 wherein the first top is at a 12 o'clock position and the second top is at a 6 o'clock position.

5. The multiple compartment decanter for brewer having a rinsing system and pivotal movements of claim 1 further comprising a water dispenser assembly for providing rinse water to the rinse tube and the rinse spray head.

* * * * *